(12) United States Patent
Martin et al.

(10) Patent No.: US 9,797,496 B2
(45) Date of Patent: Oct. 24, 2017

(54) DIFFERENTIAL ASSEMBLY WITH SPIDER SHAFT RETENTION

(71) Applicant: ArvinMeritor Technology, LLC, Troy, MI (US)

(72) Inventors: Robert J. Martin, Newark, OH (US); Aaron J. Kleinhans, Oakland, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 110 days.

(21) Appl. No.: 14/996,663

(22) Filed: Jan. 15, 2016

(65) Prior Publication Data
US 2017/0204956 A1    Jul. 20, 2017

(51) Int. Cl.
*F16H 48/40* (2012.01)
*F16H 48/08* (2006.01)

(52) U.S. Cl.
CPC ............ *F16H 48/40* (2013.01); *F16H 48/08* (2013.01); *F16H 2048/085* (2013.01)

(58) Field of Classification Search
CPC ..... F16H 48/40; F16H 48/08; F16H 2048/085
USPC ........................................ 475/230; 74/606 R
See application file for complete search history.

(56) References Cited

U.S. PATENT DOCUMENTS

| | | | | |
|---|---|---|---|---|
| 3,915,267 | A * | 10/1975 | Shea | B60B 35/12 180/217 |
| 5,273,498 | A * | 12/1993 | Dhillon | F16H 48/08 475/230 |
| 6,045,479 | A | 4/2000 | Victoria et al. | |
| 6,053,835 | A * | 4/2000 | Shibazaki | F16H 48/08 475/160 |
| 6,802,793 | B2 * | 10/2004 | Zink | F16H 48/08 475/230 |
| 7,291,083 | B2 | 11/2007 | Almaguer | |
| 7,367,914 | B2 * | 5/2008 | Rosochacki | F16H 48/08 29/893.1 |
| 7,695,392 | B2 | 4/2010 | Isken, II et al. | |
| 7,819,040 | B2 * | 10/2010 | Meier | B21D 53/90 74/607 |
| 8,535,191 | B1 | 9/2013 | Gall et al. | |
| 8,651,994 | B2 | 2/2014 | Bassi et al. | |
| 9,109,635 | B2 | 8/2015 | Boothby et al. | |
| 2009/0013533 | A1 | 1/2009 | Isken, II et al. | |
| 2012/0149522 | A1 | 6/2012 | Isken, II et al. | |
| 2015/0059180 | A1 | 3/2015 | Hirao | |
| 2015/0107933 | A1 * | 4/2015 | Gopal | F16H 48/24 180/383 |

FOREIGN PATENT DOCUMENTS

DE        102012014950 A1     1/2013

OTHER PUBLICATIONS

United States Patent and Trademark Office, U.S. Appl. No. 14/277,090, filed May 14, 2014.

(Continued)

*Primary Examiner* — Roger L Pang
(74) *Attorney, Agent, or Firm* — Brooks Kushman P.C.

(57) ABSTRACT

A differential assembly having a case and a spider. The case may have a first case portion and a second case portion. The first case portion may have a spider shaft hole and a recess. The second case portion may have a protrusion that may extend through the recess and into the spider shaft hole to retain a spider shaft in the spider shaft hole.

20 Claims, 4 Drawing Sheets

(56) References Cited

OTHER PUBLICATIONS

United States Patent and Trademark Office, U.S. Appl. No. 14/719,977, filed May 22, 2015.
European Patent Office, Extended European Search Report for the corresponding European Patent Application No. 16195368.2 dated Jun. 21, 2017.

* cited by examiner

DIFFERENTIAL ASSEMBLY WITH SPIDER SHAFT RETENTION

TECHNICAL FIELD

This disclosure relates to a differential assembly that has a case that is configured to retain shafts of a spider.

BACKGROUND

A bevel gear differential is disclosed in United States Patent Publication No. 2015/0059180.

SUMMARY

In at least one embodiment, a differential assembly is provided. The differential assembly may include a case and a spider. The case may have a first case portion and a second case portion. The first case portion may have a first cavity, an outer surface, a spider shaft hole, and a recess. The outer surface may be disposed around the first cavity. The spider shaft hole may extend from the outer surface to the first cavity. The recess may be disposed between the outer surface and the first cavity and may extend from the spider shaft hole. The second case portion may be disposed on the first case portion. The second case portion may have a protrusion that may extend through the recess into the spider shaft hole. The spider may include a primary spider shaft and a secondary spider shaft. The primary spider shaft may be mounted to the first case portion. The secondary spider shaft may be received in the spider shaft hole and may extend between the spider shaft hole and the primary spider shaft. The secondary spider shaft may have a retaining groove that may receive the protrusion to retain the secondary spider shaft in the spider shaft hole.

In at least one embodiment, a differential assembly is provided. The differential assembly may include a case and a spider. The case may rotate about an axis and may include a first case portion and a second case portion. The first case portion may have a first cavity, an outer surface, a set of spider shaft holes, and a recess. The first cavity may be disposed along the axis. The outer surface may extend around the first cavity. The set of spider shaft holes may be spaced apart from each other and may extend from the outer surface to the first cavity. The recess may be disposed between the outer surface and the first cavity and may extend from each member of the set of spider shaft holes. The second case portion may be disposed on the first case portion. The second case portion may have a second cavity and a protrusion. The second cavity may be disposed along the axis. The protrusion may extend through the recess into each member of the set of spider shaft holes. The spider may be at least partially disposed in the first cavity. The spider may include a primary spider shaft and a secondary spider shaft. The primary spider shaft may be received in first and second members of the set of spider shaft holes. The secondary spider shaft may be received in a third member of the set of spider shaft holes and may extend to the primary spider shaft. The secondary spider shaft may have a retaining groove that may receive the protrusion to retain the secondary spider shaft in the spider shaft hole.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
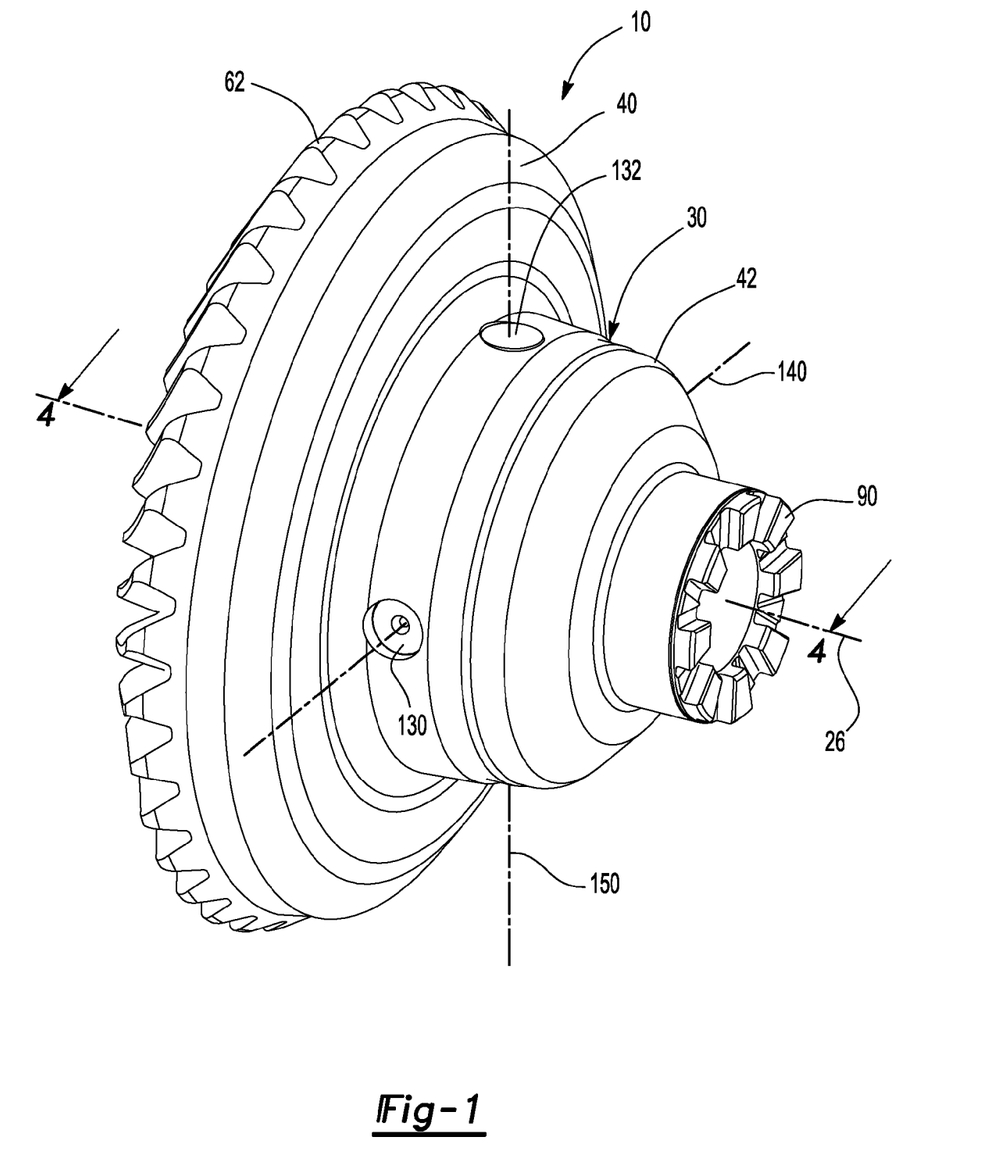
FIG. 1 is a perspective view of a differential assembly.

Referring to FIG. 1, an exemplary differential assembly 10 is shown. The differential assembly 10 may be configured for use with a vehicle, such as a motor vehicle like a truck, bus, farm equipment, military transport or weaponry vehicle, or cargo loading equipment for land, air, or marine vessels.

The differential assembly 10 may be provided with a vehicle drivetrain component, such as an axle assembly or transfer case, or wheel hub assembly. For example, the differential assembly 10 may be configured as an interaxle differential unit that may be provided with an axle assembly to compensate for speed differences between different axle assemblies that may be connected in series. The differential assembly 10 may also be provided with a wheel hub assembly that may rotatably support a vehicle wheel to provide gear reduction or gear ratio modification between a wheel axle and a traction wheel. The differential assembly 10 is described below primarily in the context of an axle assembly 12 and more specifically as a differential assembly 10 that may transmit torque to two wheel axles and their associated traction wheel assemblies and may permit the wheel axles and traction wheel assemblies to rotate at different velocities. As such, the differential assembly 10 may facilitate the transfer of torque between components and/or allow components to rotate at different velocities.

Figure 4:
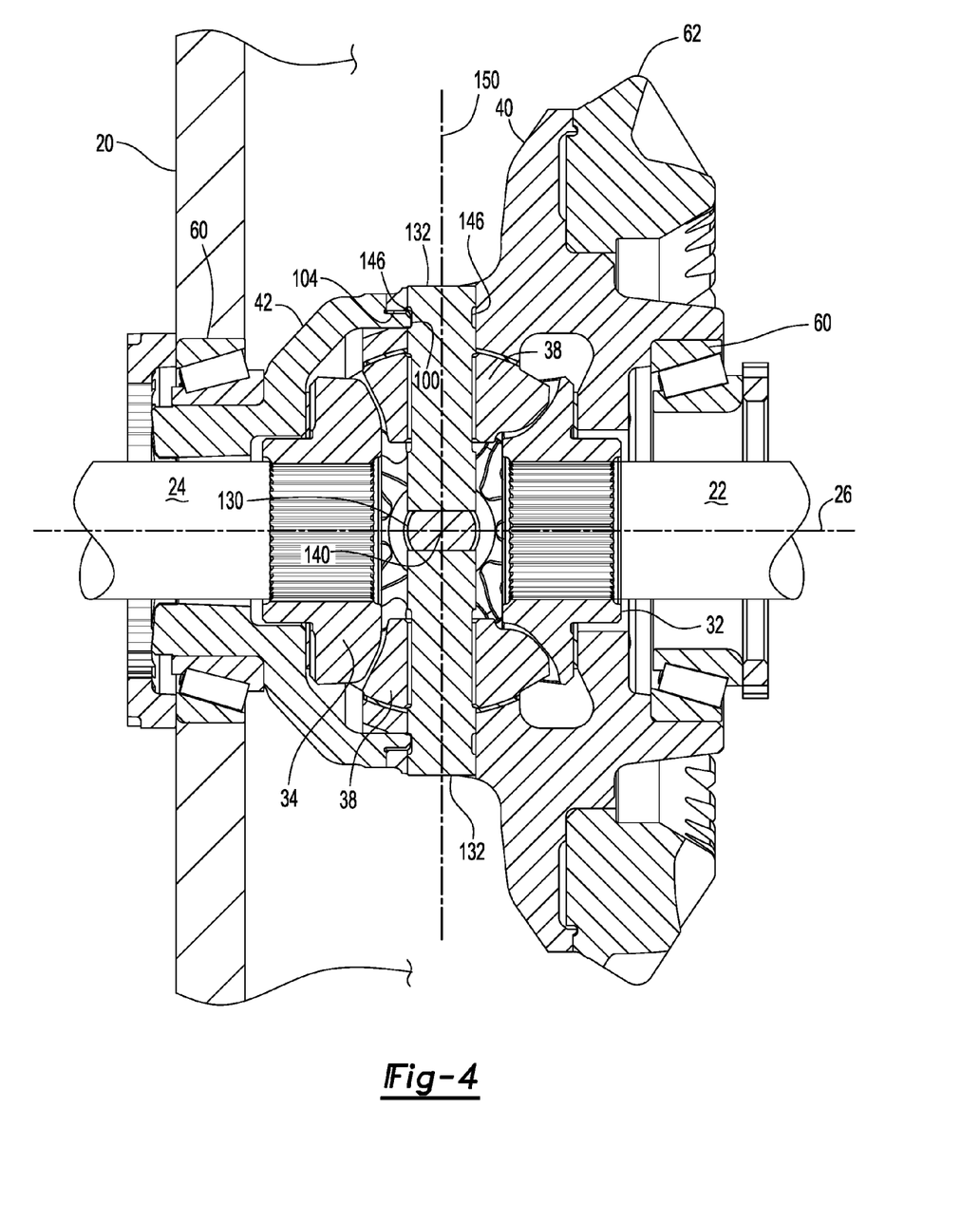
FIG. 4 is a section view of the differential assembly along section line 4-4.

Referring to FIG. 4, the axle assembly 12 may include a housing 20, a first shaft 22, and a second shaft 24.

The housing 20 may receive the differential assembly 10 and various components of the axle assembly 12. In addition, the housing 20 may facilitate mounting of the axle assembly 12 to the vehicle. In FIG. 4, only a portion of the housing 20 is shown to more clearly illustrate the differential assembly 10.

The first shaft 22 and the second shaft 24 may be at least partially disposed in the housing 20. In addition, the first shaft 22 and the second shaft 24 may be spaced apart from each other and may extend in opposite directions from the differential assembly 10. The first shaft 22 and the second shaft 24 may be configured to rotate about an axis 26. For instance, the first shaft 22 and the second shaft 24 may rotate independently or at different speeds about the axis 26 due to operation of the differential assembly 10. In at least one embodiment, the first shaft 22 and the second shaft 24 may be wheel axles or may be operatively connected to corresponding wheel axles that may be connected to corresponding wheel assemblies. As such, the first shaft 22 and/or the second shaft 24 may be rotated about the axis 26 by the differential assembly 10 to provide torque to a corresponding wheel assembly. In an interaxle differential unit configuration, the first shaft 22 may be an input shaft that may receive an input torque and the second shaft 24 may be an output shaft that may provide torque to another axle assembly. In a wheel hub assembly configuration, the first shaft 22 may be a wheel axle or may receive an input torque from a wheel axle and the second shaft 24 may provide torque to a wheel assembly.

Figure 2:
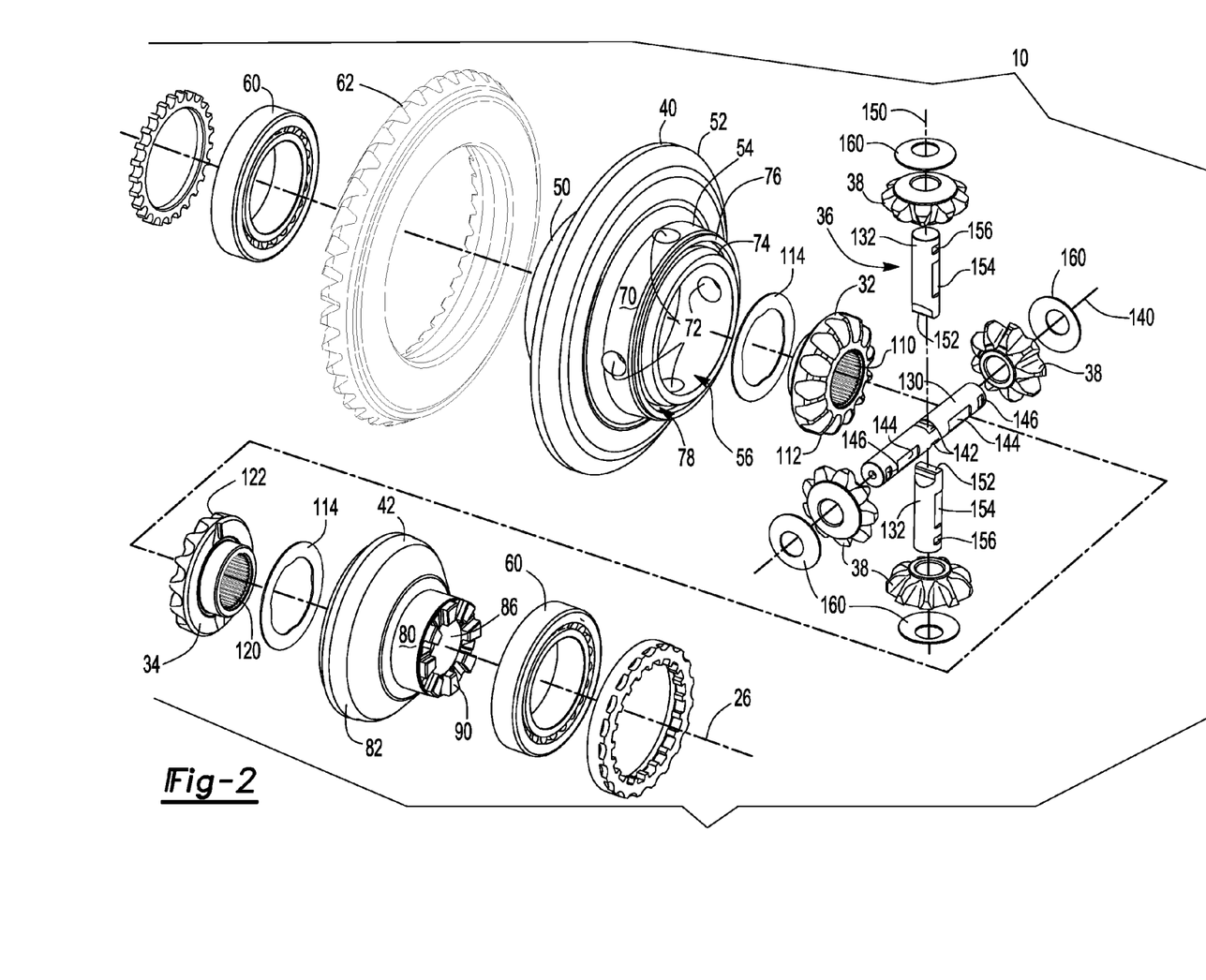
FIGS. 2 and 3 are exploded views of the differential assembly.
Figure 3:
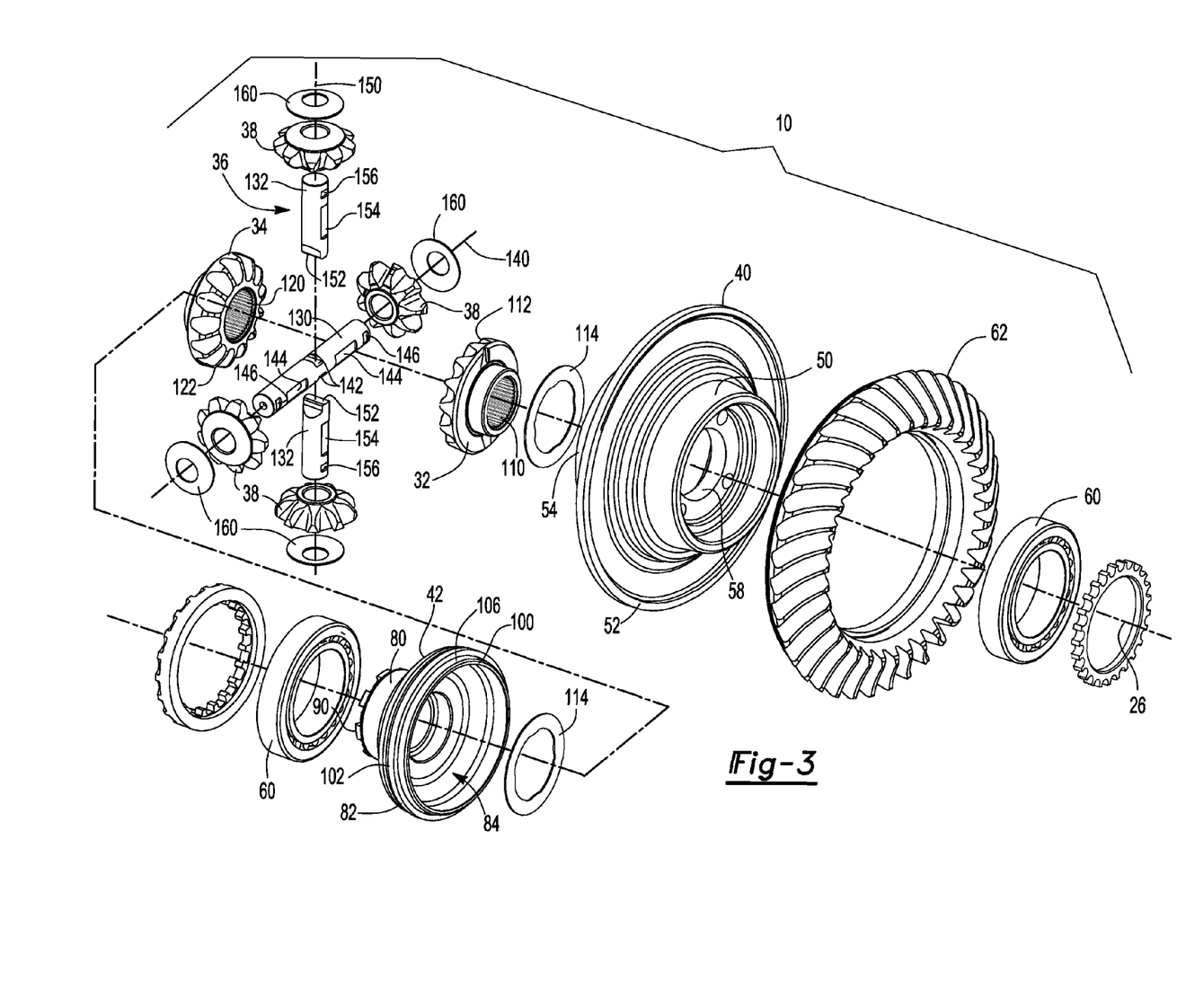

Referring to FIGS. 1-3, an example of a differential assembly 10 is shown in more detail. In at least one embodiment, the differential assembly 10 may include a case 30, a first gear 32, a second gear 34, a spider 36, and at least one pinion gear 38.

The case 30 may be configured to receive components of the differential assembly 10. In addition, the case 30 may be configured to rotate about the axis 26. In at least one embodiment, the case 30 may include a first case portion 40 and a second case portion 42 that may cooperate to at least partially define a cavity. The cavity may at least partially receive the first gear 32, second gear 34, spider 36, and pinion gear(s) 38.

Referring to FIGS. 2 and 3, an example of a first case portion 40 is shown. The first case portion 40 may include a first bearing portion 50, a flange portion 52, a first mounting portion 54, a first cavity 56, and a first hole 58.

The first bearing portion 50 may extend around the axis 26 and may extend around and may at least partially define the first hole 58. As is best shown in FIG. 4, the first bearing portion 50 may be disposed proximate and may engage a bearing 60 that may rotatably support the first case portion 40. The bearing 60 may be a roller bearing assembly that may include a plurality of rolling elements, such as balls or rollers, which may be disposed between an inner race and an outer race. The bearing 60 may be mounted on another component, such as the housing 20.

The flange portion 52 may be disposed between the first bearing portion 50 and the first mounting portion 54. The flange portion 52 may extend away from the axis 26 and may extend further away from the axis 26 than the first bearing portion 50 and the first mounting portion 54. A ring gear 62 may be fixedly mounted to the flange portion 52 in some differential configurations, such as when the differential assembly 10 is provided in an axle assembly 12 and the first shaft 22 and second shaft 24 are wheel axles or transmit torque to wheel axles and traction wheel assemblies. The ring gear 62 may engage a pinion and receive torque from a pinion that may receive torque from a drivetrain component, such as an internal combustion engine, transmission, or transfer case. Torque provided to the pinion may be transmitted to the ring gear 62 and then to corresponding wheel end assemblies and traction wheels via the first shaft 22 and the second shaft 24. Alternatively, the ring gear may be omitted in various configurations, such as when the differential assembly is configured as an interaxle differential unit.

The first mounting portion 54 may extend from the flange portion 52 toward the second case portion 42. As is best shown in FIG. 2, the first mounting portion 54 may extend around and may at least partially define the first cavity 56. In at least one embodiment, the first mounting portion 54 may have an outer surface 70, a set of spider shaft holes 72, an inner wall 74, an outer wall 76, and a recess 78.

The outer surface 70 may be an exterior of the first mounting portion 54. The outer surface may extend around the axis 26 and the first cavity 56 and may face away from the first cavity 56.

The set of spider shaft holes 72 may be provided in the first mounting portion 54. A spider shaft hole 72 may receive a spider shaft of the spider 36 as will be discussed in more detail below. In the embodiment shown in FIG. 2, four spider shaft holes 72 are shown; however, it is contemplated that a greater or lesser number of spider shaft holes 72 may be provided. The spider shaft holes 72 may be spaced apart from each other and may be arranged around the axis 26. For example, spider shaft holes 72 may be disposed along axes that may be disposed substantially perpendicular to the axis 26. The spider shaft holes 72 may be through holes that may be completely defined in the first case portion 40. For example, spider shaft holes 72 may extend from the first cavity 56 to the outer surface 70.

The inner wall 74 may extend from an end of the first mounting portion 54 toward the second case portion 42. The inner wall 74 may at least partially define the first cavity 56. As such, the inner wall 74 may be disposed between the first cavity 56 and the recess 78. For example, the inner wall 74 may extend from the first cavity 56 to the recess 78. The inner wall 74 may be configured as a ring that may extend continuously around the axis 26 in one or more embodiments. In addition, the inner wall 74 may extend further from the flange portion 52 than the outer wall 76 in an axial direction or a direction parallel to the axis 26.

The outer wall 76 may also extend from an end of the first mounting portion 54 toward the second case portion 42. The outer wall 76 may at least partially define the outer surface 70 in one or more embodiments. The outer wall 76 may cooperate with the inner wall 74 to at least partially define the recess 78. As such, the outer wall 76 may be disposed between the outer surface 70 and the recess 78. For example, the outer wall 76 may extend from the outer surface 70 to the recess 78. The outer wall 76 may be configured as a ring that may extend continuously around the axis 26.

The recess 78 may be disposed between the first cavity 56 and the outer surface 70. For instance, the recess 78 may be disposed between the inner wall 74 and the outer wall 76 and may be spaced apart from or separated from the first cavity 56 and the outer surface 70. The recess 78 may extend to one or more spider shaft holes 72. As such, the recess 78 may intersect and may not be separated from a spider shaft hole 72. In the embodiment shown in FIG. 2, the recess 78 is configured as a ring that may be radially disposed about the axis 26 and that may extend continuously around the axis 26 and may extend from an end of the first mounting portion 54 to the spider shaft holes 72. Alternatively, the recess 78 may not extend continuously around the axis 26. For example, a plurality of recesses 78 may be provided that may each extend from a corresponding spider shaft hole 72 to an end of the first mounting portion 54 such that one or more recesses may be spaced apart from each other.

The first cavity 56 may be disposed in the first case portion 40. The first cavity 56 may receive the first gear 32, spider 36, and at least a portion of a pinion gear 38. In addition, the first cavity 56 may extend from an end of the first mounting portion 54 to the first hole 58.

The first hole 58 may be disposed along the axis 26. The first hole 58 may be configured to receive the first shaft 22 and/or the first gear 32. For example, the first hole 58 may be provided with a stepped configuration that may help position and inhibit axial movement of the first gear 32 away from the second gear 34. The first hole 58 may also receive a bearing 60 that may rotatably support the case 30 as is best shown in FIG. 4.

Referring to FIGS. 2 and 3, the second case portion 42 may be mounted to and may not rotate with respect to the first case portion 40. For instance, the second case portion 42 may be welded to the first case portion 40 with a weld that may extend from the outer surface 70 toward the axis 26 and may extend continuously around the axis 26. Alternatively, the first case portion 40 and the second case portion 42 may be assembled using one or more fasteners, such as bolts. In at least one embodiment, the second case portion 42 may include a second bearing portion 80, a second mounting portion 82, a second cavity 84, and a second hole 86.

The second bearing portion 80 may extend around the axis 26 and may extend around the second hole 86. As is best shown in FIG. 4, a bearing 60 that rotatably supports the second case portion 42 may be disposed on the second bearing portion 80. The bearing 60 may be mounted on another component, such as the housing 20. Gear teeth 90 may be provided with the second bearing portion 80 to facilitate locking of the differential assembly 10. For instance, a clutch collar may selectively engage the gear teeth 90 to lock the differential assembly 10 and inhibit the second shaft 24 from rotating with respect to the case 30 and the first shaft 22 in a manner known by those skilled in the art.

The second mounting portion 82 may extend outwardly from the second bearing portion 80 toward the first case portion 40. As is best shown in FIG. 3, the second mounting portion 82 may extend around and may at least partially define the second cavity 84. In at least one embodiment, the second mounting portion 82 may have a protrusion 100.

The protrusion 100 may be disposed between the second cavity 84 and an outer surface 102 of the second case portion 42. The protrusion 100 may be configured as a ring that may extend continuously around the axis 26 and the inner wall 74 of the first case portion 40. The protrusion 100 may also be radially disposed about the axis 26. In addition the protrusion 100 may extend from an end of the second mounting portion 82 through the recess 78 and into one or more spider shaft holes 72 when the case 30 is assembled. Alternately, the protrusion 100 may not extend continuously around the axis 26. For example a plurality of protrusions 100 may be provided that may be spaced apart from each other and that may extend through a recess 78 and into a corresponding spider shaft hole 72. As is best shown in FIG. 4, a gap 104 may be provided between an exterior surface 106 of the protrusion 100 and the outer wall 76. The gap 104 may provide clearance that may allow a weld that joins the first case portion 40 to the second case portion 42 to fully penetrate to the gap 104 but not penetrate the protrusion 100. The exterior surface 106 may be an outside circumference of the protrusion 100.

Referring again to FIGS. 2 and 3, the second cavity 84 may be disposed in the second case portion 42. The second cavity 84 may receive the second gear 34 and may receive a portion of a pinion gear 38. For instance, the inner wall 74 may extend into and may be received in the second cavity 84. The second cavity 84 may extend from an end of the second mounting portion 82 to the second hole 86.

The second hole 86, which is best shown in FIG. 3, may be disposed along the axis 26. The second hole 86 may be configured to receive the second shaft 24 and/or the second gear 34. For example, the second hole 86 may be provided with a stepped configuration that may help position and inhibit axial movement of the second gear 34 away from the first gear 32.

The first gear 32 may be disposed in the first case portion 40. For example, the first gear 32 may be at least partially disposed in the first hole 58 and may be configured to rotate about the axis 26. In at least one embodiment, the first gear 32 may include a first gear hole 110 and a gear portion 112.

The first gear hole 110 may be disposed along the axis 26. The first gear hole 110 may be configured to receive the first shaft 22. The first gear 32 may rotate with the first shaft 22. For example, the first gear hole 110 may have a spline that may mate with a corresponding spline on the first shaft 22 such that the first gear 32 may not rotate with respect to the first shaft 22.

The gear portion 112 may face toward and may be spaced apart from the spider 36. The gear portion 112 may have a set of teeth that may be arranged around the axis 26 and that may mate with teeth on one or more pinion gears 38. A thrust washer 114 or bearing may be disposed between the gear portion 112 and the first case portion 40.

The second gear 34 may be disposed in the second case portion 42. For example, the second gear 34 may be at least partially disposed in the second hole 86 and may be configured to rotate about the axis 26. The second gear 34 may be spaced apart from the first gear 32 and may have a similar or identical configuration as the first gear 32. In at least one embodiment, the second gear 34 may include a second gear hole 120 and a gear portion 122.

The second gear hole 120 may be disposed along the axis 26. The second gear hole 120 may be configured to receive the second shaft 24. In at least one embodiment, the second gear 34 may rotate with the first shaft 22. For example, the second gear hole 120 may have a spline that may mate with a corresponding spline on the second shaft 24 such that the second gear 34 may not rotate with respect to the second shaft 24.

The gear portion 122 may face toward and may be spaced apart from the spider 36. The gear portion 122 may have a set of teeth that may be arranged around the axis 26 and that may mate with teeth on one or more pinion gears 38. A thrust washer 114 or bearing may be disposed between the gear portion 122 and the second case portion 42.

The spider 36 may rotate about the axis 26 with the case 30. In at least one embodiment, the spider 36 may include a primary spider shaft 130 and at least one secondary spider shaft 132.

The primary spider shaft 130 may be mounted to the first case portion 40. For example, the primary spider shaft 130 may have opposing ends that may be received in corresponding spider shaft holes 72 of the first case portion 40. As such, the primary spider shaft 130 may extend across the first cavity 56 and may extend through the axis 26. The primary spider shaft 130 may be disposed along a primary spider shaft axis 140. The primary spider shaft axis 140 may intersect and may be disposed substantially perpendicular to the axis 26. The primary spider shaft 130 may have a generally cylindrical configuration and may include a notch 142, a lubricant groove 144, and a retaining groove 146.

One or more notches 142 may be disposed proximate the center of the primary spider shaft 130. In the embodiment shown in FIGS. 2 and 3, two notches 142 are provided that are disposed opposite each other and extend inwardly toward the axis 26. A notch 142 may receive and facilitate positioning of a secondary spider shaft 132 with respect to the primary spider shaft 130.

One or more lubricant grooves 144 may be disposed between the axis 26 and an end of the primary spider shaft 130. For instance, a lubricant groove 144 may be disposed between the axis 26 and a retaining groove 146. In the embodiment shown in FIGS. 2 and 3, a pair of lubricant grooves 144 is disposed proximate opposite ends of the primary spider shaft 130. Each pair of lubricant grooves 144 may have two grooves that may be disposed opposite each other and extend toward the primary spider shaft axis 140. The lubricant groove 144 may be disposed adjacent to a pinion gear 38 and may allow lubricant, such as oil, to flow between the hole of the pinion gear 38 and the outside of the primary spider shaft 130 to help reduce friction between the pinion gear 38 and the primary spider shaft 130. The lubricant grooves 144 may have a greater axial length or length in a direction that extends along the primary spider shaft axis 140 than the retaining grooves 146.

One or more retaining grooves 146 may be disposed between the axis 26 and an end of the primary spider shaft 130. For instance, a retaining groove 146 may be disposed between the lubricant groove 144 and an end of the primary spider shaft 130. In addition, the retaining groove 146 may be spaced apart or separated from the lubricant groove 144. In the embodiment shown in FIGS. 2 and 3, two retaining grooves 146 are provided that are disposed directly opposite each other and extend toward the primary spider shaft axis 140. At least one retaining groove 146 may face toward the second case portion 42 and may receive and may engage the protrusion 100 of the second case portion 42. As such, the protrusion 100 may help inhibit movement of the primary spider shaft 130 along the primary spider shaft axis 140 and rotation of the primary spider shaft 130 about the primary spider shaft axis 140.

One or more secondary spider shafts 132 may be mounted to the first case portion 40. The secondary spider shaft 132 may extend between a spider shaft hole 72 and the primary spider shaft 130. For example, the secondary spider shaft 132 may have a first end that may be received in the notch 142 of the primary spider shaft 130 and a second end that may be disposed opposite the first end and may be received in a corresponding spider shaft hole 72. The secondary spider shaft 132 may be disposed along a secondary spider shaft axis 150. The secondary spider shaft axis 150 may intersect and may be disposed substantially perpendicular to the axis 26 and the primary spider shaft axis 140. In addition, the primary spider shaft axis 140 and secondary spider shaft axis 150 may be substantially coplanar or disposed in a common plane. In the embodiment shown in FIGS. 2 and 3, two secondary spider shafts 132 are provided that are disposed on opposite sides of the primary spider shaft 130 and are coaxially disposed along the secondary spider shaft axis 150. The secondary spider shafts 132 may have common or substantially identical configurations that may include a tapered end 152, a lubricant groove 154, and a retaining groove 156.

The tapered end 152 may be disposed proximate the primary spider shaft 130. For example the tapered end 152 may be received in a notch 142 of the primary spider shaft 130. The secondary spider shaft 132 and its tapered end 152 may not be fixedly attached to the primary spider shaft 130 in one or more embodiments.

One or more lubricant grooves 154 may be disposed between the axis 26 and an end of the secondary spider shaft 132. For instance, a lubricant groove 154 may be disposed between the axis 26 and a retaining groove 156 of the secondary spider shaft 132. In the embodiment shown in FIGS. 2 and 3, two lubricant grooves 154 are provided that are disposed opposite each other and extend toward the secondary spider shaft axis 150. The lubricant groove 154 may be disposed adjacent to a pinion gear 38 and may allow lubricant, such as oil, to flow between the hole of the pinion gear 38 and the outside of the secondary spider shaft 132 to help reduce friction between the pinion gear 38 and the secondary spider shaft 132. The lubricant grooves 154 may have a greater axial length or length in a direction that extends along the secondary spider shaft axis 150 than the retaining grooves 156.

One or more retaining grooves 156 may be disposed between the axis 26 and an end of the secondary spider shaft 132. For instance, a retaining groove 156 may be disposed between the lubricant groove 154 and an end of the secondary spider shaft 132. In addition, the retaining groove 156 may be spaced apart from the lubricant groove 154. In the embodiment shown in FIGS. 2 and 3, two retaining grooves 156 are provided that are disposed directly opposite each other and extend toward the secondary spider shaft axis 150. At least one retaining groove 156 may face toward the second case portion 42 and may receive and may engage the protrusion 100 of the second case portion 42. As such, the protrusion 100 may help inhibit movement of the secondary spider shaft 132 along the secondary spider shaft axis 150 and rotation of the secondary spider shaft 132 about the secondary spider shaft axis 150.

A pinion gear 38 may be rotatably disposed on the primary spider shaft 130 and the secondary spider shafts 132. For instance, two pinion gears 38 may be disposed on the primary spider shaft 130 proximate corresponding lubricant grooves 144 while a single pinion gear 38 may be disposed on each secondary spider shaft 132 proximate a corresponding lubricant groove 154. Each pinion gear 38 may be disposed in the cavity of the case 30 and may be retained on a corresponding spider shaft with one or more fasteners 160, such as a washer and/or a thrust bearing. The fastener 160 may engage the inner wall 74 of the first case portion 40. The pinion gears 38 on the primary spider shaft 130 may rotate about the primary spider shaft axis 140. The pinion gear 38 on the secondary spider shaft 132 may rotate about the secondary spider shaft axis 150. Each pinion gear 38 may include a set of teeth that mate with teeth on the first gear 32 and teeth on the second gear 34.

The differential assembly described above may allow a multi-piece spider having one or more spider shafts to be retained in a case of a differential prior to joining the first and second case portions together, thereby facilitating assembly. In addition, the differential assembly described above may allow the positioning of spider shafts to be readily inspected and checked prior to welding the first and second case portions. The differential assembly described above may also allow one or more spider shafts to be retained without the use of additional fasteners or separate fasteners, such as a screw or roll pin, thereby reducing the number of parts, assembly time, and associated costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A differential assembly comprising:
a case that includes:
 a first case portion that has a first cavity, an outer surface that is disposed around the first cavity, a spider shaft hole that extends from the outer surface to the first cavity, and a recess that is disposed between the outer surface and the first cavity and that extends from the spider shaft hole; and
 a second case portion that is disposed on the first case portion and has a second cavity that extends from the first cavity, wherein the second case portion has a protrusion that extends through the recess into the spider shaft hole; and
a spider that includes:

a primary spider shaft that is mounted to the first case portion; and a secondary spider shaft that is received in the spider shaft hole and that extends between the spider shaft hole and the primary spider shaft, wherein the secondary spider shaft has a retaining groove that receives the protrusion to retain the secondary spider shaft in the spider shaft hole.

2. The differential assembly of claim 1 wherein the case is configured to rotate about an axis and the recess extends continuously around the axis.

3. A differential assembly comprising:
a case that is configured to rotate about an axis and includes:
a first case portion that has a first cavity, an outer surface that is disposed around the first cavity, a spider shaft hole that extends from the outer surface to the first cavity, and a recess that is disposed between the outer surface and the first cavity and that extends from the spider shaft hole; and
a second case portion that is disposed on the first case portion and has a second cavity that extends from the first cavity, wherein the second case portion has a protrusion that extends continuously around the axis and extends through the recess into the spider shaft hole; and
a spider that includes:
a primary spider shaft that is mounted to the first case portion; and
a secondary spider shaft that is received in the spider shaft hole and that extends between the spider shaft hole and the primary spider shaft, wherein the secondary spider shaft has a retaining groove that receives the protrusion to retain the secondary spider shaft in the spider shaft hole.

4. The differential assembly of claim 1 wherein the recess is spaced apart from the outer surface and the first cavity.

5. The differential assembly of claim 4 wherein the first case portion further comprises an inner wall and an outer wall that cooperate to at least partially define the recess, wherein the inner wall extends from the first cavity to the recess and the outer wall extends from the outer surface to the recess.

6. The differential assembly of claim 5 wherein the inner wall is received in the second cavity.

7. The differential assembly of claim 6 wherein the case is configured to rotate about an axis and the inner wall and the outer wall extend continuously around the axis.

8. The differential assembly of claim 6 wherein the protrusion extends continuously around the inner wall of the first case portion.

9. The differential assembly of claim 1 wherein the spider shaft hole is a through hole that is completely defined in the first case portion.

10. The differential assembly of claim 1 further comprising a pinion that is rotatably disposed on the secondary spider shaft, wherein the secondary spider shaft has a lubricant groove that is disposed between the pinion and secondary spider shaft and is separated from the retaining groove.

11. The differential assembly of claim 1 wherein the primary spider shaft has a notch that receives a tapered end of the secondary spider shaft such that the secondary spider shaft is not fixedly attached to the primary spider shaft.

12. A differential assembly comprising:
a case that rotates about an axis and includes:
a first case portion that has a first cavity disposed along the axis, an outer surface that extends around the first cavity, a set of spider shaft holes that are spaced apart from each other and extend from the outer surface to the first cavity, and a recess that is disposed between the outer surface and the first cavity and that extends from each member of the set of spider shaft holes; and
a second case portion that is disposed on the first case portion and has a second cavity disposed along the axis and a protrusion that extends through the recess into each member of the set of spider shaft holes; and
a spider that is at least partially disposed in the first cavity, the spider including:
a primary spider shaft that is received in first and second members of the set of spider shaft holes; and
a secondary spider shaft that is received in a third member of the set of spider shaft holes and that extends from the third member to the primary spider shaft, wherein the secondary spider shaft has a retaining groove that receives the protrusion to retain the secondary spider shaft in the spider shaft hole.

13. The differential assembly of claim 12 wherein the protrusion engages the secondary spider shaft.

14. The differential assembly of claim 12 wherein the spider further comprises a second secondary spider shaft that is received in a fourth member of the set of spider shaft holes and that extends from the fourth member to the primary spider shaft.

15. The differential assembly of claim 14 wherein the second secondary spider shaft has a retaining groove that receives the protrusion to retain the second secondary spider shaft in the spider shaft hole.

16. The differential assembly of claim 15 wherein the protrusion engages the second secondary spider shaft.

17. The differential assembly of claim 15 wherein the primary spider shaft has a pair of retaining grooves disposed proximate opposite ends of the primary spider shaft, wherein the protrusion is received in the pair of retaining grooves.

18. The differential assembly of claim 15 wherein the primary spider shaft is disposed along a primary spider shaft axis and the secondary spider shaft and the second secondary spider shaft are disposed along a secondary spider shaft axis.

19. The differential assembly of claim 18 wherein the primary spider shaft and the primary spider shaft axis both intersect the axis.

20. The differential assembly of claim 12 further comprising a first gear disposed in the first cavity, a second gear disposed in the second cavity, and pinion gears that engage the first gear and the second gear, wherein two pinion gears are rotatably disposed on the primary spider shaft and one pinion gear is disposed on the secondary spider shaft.

* * * * *